US011741564B2

(12) United States Patent
Johnson et al.

(10) Patent No.: US 11,741,564 B2
(45) Date of Patent: Aug. 29, 2023

(54) SEQUENCE ADJUSTMENT FOR EXECUTING FUNCTIONS ON HEMS IN AN ORDER

(71) Applicant: Locus Robotics Corp., Wilmington, MA (US)

(72) Inventors: Michael Charles Johnson, Ashland, MA (US); Sean Johnson, Danvers, MA (US); Rick Faulk, Andover, MA (US)

(73) Assignee: Locus Robotics Corp., Wilmington, MA (US)

( * ) Notice: Subject to any disclaimer, the term of this patent is extended or adjusted under 35 U.S.C. 154(b) by 350 days.

(21) Appl. No.: 17/017,758

(22) Filed: Sep. 11, 2020

(65) Prior Publication Data
US 2022/0084153 A1   Mar. 17, 2022

(51) Int. Cl.
*G06F 7/00*    (2006.01)
*G06Q 50/28*   (2012.01)
(Continued)

(52) U.S. Cl.
CPC .......... *G06Q 50/28* (2013.01); *B65G 1/1373* (2013.01); *G05D 1/0297* (2013.01);
(Continued)

(58) Field of Classification Search
CPC ............. G06Q 50/28; G06Q 10/06315; G06Q 10/06316; G06Q 10/20; G06Q 10/06;
(Continued)

(56) References Cited

U.S. PATENT DOCUMENTS 8,326,679 B1   12/2012   Rowe et al.
8,983,647 B1    3/2015   Dwarakanath et al.
(Continued)

FOREIGN PATENT DOCUMENTS

WO   2018/132793 A1   7/2018

OTHER PUBLICATIONS

Rule et al., Designing interfaces for multi-user, multi-robot systems, 2012, IEEE, p. 97-104 (Year: 2012).
(Continued)

*Primary Examiner* — Yolanda R Cumbess
(74) *Attorney, Agent, or Firm* — Sunstein LLP

(57) ABSTRACT

A method for executing orders assigned to a plurality of robots operating in a warehouse, including receiving an order with a plurality of items, each item associated with an item location. The method includes defining a plurality of regions and identifying the regions which include at least one item location associated with the order received by the robot. The method also includes determining, from the regions identified, which regions which include at least one operator and assessing criteria relating to a current location of the robot and to the item locations associated with the regions having at least one operator. The method further includes selecting an item location to which the robot is to navigate from a current location based on an assessment of criteria relating to the current location of the robot and to the item locations associated with the regions in which are located at least one operator.

12 Claims, 12 Drawing Sheets

(51) Int. Cl.
  *B65G 1/137* (2006.01)
  *G05D 1/02* (2020.01)
  *G06Q 10/0631* (2023.01)
  *G06Q 10/20* (2023.01)

(52) U.S. Cl.
  CPC . *G06Q 10/06315* (2013.01); *G06Q 10/06316* (2013.01); *G06Q 10/20* (2013.01); *G05D 2201/0216* (2013.01)

(58) Field of Classification Search
  CPC ............... G06Q 10/08; G06Q 10/083; G06Q 10/08355; G06Q 10/087; G06Q 10/00; B65G 1/1373; G05D 1/0297; G05D 2201/0216
  USPC .......................................... 700/213–216, 228
  See application file for complete search history.

(56) References Cited

U.S. PATENT DOCUMENTS

| | | |
|---|---|---|
| 9,346,620 B2 | 5/2016 | Brunner et al. |
| 9,463,927 B1 | 10/2016 | Theobald |
| 9,776,324 B1 | 10/2017 | Johnson et al. |
| 9,829,333 B1 | 11/2017 | Calder |
| 10,022,867 B2 | 7/2018 | Saboo et al. |
| 10,296,995 B2 | 5/2019 | Saboo et al. |
| 10,414,052 B2 | 9/2019 | Deyle et al. |
| 10,513,033 B2 | 12/2019 | Johnson et al. |
| 10,562,707 B1 | 2/2020 | Wise et al. |
| 2005/0216294 A1 | 9/2005 | Labow |
| 2007/0192910 A1 | 8/2007 | Vu et al. |
| 2008/0215179 A1 | 9/2008 | Yair et al. |
| 2010/0296908 A1 | 11/2010 | Ko |
| 2011/0200420 A1 | 8/2011 | Driskill et al. |
| 2012/0152877 A1 | 6/2012 | Fadayon |
| 2012/0330458 A1 | 12/2012 | Weiss |
| 2013/0317642 A1* | 11/2013 | Asaria ............... G06Q 10/08 700/216 |
| 2014/0100715 A1 | 4/2014 | Mountz et al. |
| 2014/0136255 A1 | 5/2014 | Grabovski et al. |
| 2015/0088310 A1 | 3/2015 | Pinter et al. |
| 2015/0360865 A1 | 12/2015 | Massey |
| 2015/0367513 A1 | 12/2015 | Gettings et al. |
| 2016/0101940 A1 | 4/2016 | Grinnell et al. |
| 2017/0032306 A1 | 2/2017 | Johnson et al. |
| 2017/0278047 A1 | 9/2017 | Welty et al. |
| 2017/0285648 A1 | 10/2017 | Welty et al. |
| 2017/0286916 A1 | 10/2017 | Skiba et al. |
| 2018/0029797 A1 | 2/2018 | Hance et al. |
| 2018/0043533 A1 | 2/2018 | Johnson et al. |
| 2018/0059635 A1 | 3/2018 | Johnson et al. |
| 2018/0108102 A1 | 4/2018 | Kapuria |
| 2018/0130015 A1 | 5/2018 | Jones et al. |
| 2018/0201444 A1 | 7/2018 | Welty et al. |
| 2018/0239343 A1 | 8/2018 | Voorhies et al. |
| 2018/0300798 A1 | 10/2018 | Rajkhowa et al. |
| 2018/0370728 A1 | 12/2018 | Gallagher et al. |
| 2019/0094866 A1 | 3/2019 | Moore et al. |
| 2019/0138978 A1 | 5/2019 | Johnson et al. |
| 2020/0033867 A1 | 1/2020 | Grant et al. |
| 2020/0061839 A1 | 2/2020 | Deyle et al. |
| 2020/0103921 A1* | 4/2020 | Voorhies ............... G05D 1/0217 |
| 2020/0202285 A1 | 6/2020 | Elazary et al. |
| 2020/0239231 A1 | 7/2020 | Johnson et al. |
| 2020/0246972 A1 | 8/2020 | Johnson et al. |
| 2020/0246978 A1 | 8/2020 | Johnson et al. |
| 2020/0275984 A1 | 9/2020 | Brisson et al. |
| 2020/0278667 A1 | 9/2020 | Voorhies et al. |
| 2020/0316786 A1* | 10/2020 | Galluzzo ............... B25J 9/1666 |
| 2020/0338741 A1* | 10/2020 | Voorhies ............... B25J 11/00 |

OTHER PUBLICATIONS

Shiomi et al., Field trial of networked social robots in a shopping mall, 2009, IEEE, p. 2846-2853 (Year: 2009).

Hughes et al., Camera orientation: an opportunity for human-robot collaborative control, 2005, IEEE, p. 1-6 (Year: 2005).

Trouvain et al., Comparison of a map- vs. camera-based user interface in a multi-robot navigation task, 2003, IEEE, pg. 3224-3231 (Year: 2003).

International Search Report with Written Opinion, dated Mar. 31, 2020, received in international patent application No. PCT/US2020/016193, 11 pages.

International Search Report with Written Opinion, dated Mar. 30, 2020, received in international patent application No. PCT/2020/016055, 13 pages.

International Search Report with Written Opinion, dated Apr. 1, 2020, received in international patent application No. PCT/US2020/015811, 11 pages.

International Searching Authority/EP, International Search Report and Written Opinion of the International Searching Authority, Application No. PCT/US2021/049239, dated Nov. 22, 2021, 15 pages.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

SEQUENCE ADJUSTMENT FOR EXECUTING FUNCTIONS ON HEMS IN AN ORDER

FIELD OF THE INVENTION

This invention relates to the use of autonomous mobile robots in warehouse order fulfillment operations and more specifically to a system and method for adjusting the sequence of executing functions on items in an order based on operator location in the warehouse to improve efficiency.

BACKGROUND OF THE INVENTION

Order fulfillment is typically performed in a large warehouse filled with products to be shipped to customers who have placed their orders over the internet for home delivery. In some operations, robots may be used to assist humans in item retrieval in order to increase productivity and efficiency. Fulfilling such orders in a timely, accurate and efficient manner is logistically challenging to say the least. Clicking the "check out" button in a virtual shopping cart creates an "order." The order includes a listing of items to be picked so that they may be shipped to the address of the customer who placed the order. The process of "fulfillment" involves physically taking or "picking" these items from a large warehouse, packing them, and shipping them to the designated address. An important goal of the order-fulfillment process is thus to ship as many items in as short a time as possible.

A warehouse management system (WMS) is a software application that supports the day-to-day operations in an order fulfillment warehouse like the one described above. WMS programs enable centralized management of tasks, such as tracking inventory levels and stock locations. Warehouse management systems also support or direct all of the major and many minor warehouse tasks such as receiving, inspection and acceptance, put-away, internal replenishment to picking positions, picking, packing, order assembly on the shipping dock, documentation, and shipping (loading onto carrier vehicles).

The WMS typically receives orders from the overlying host system, usually an ERP system. For order fulfillment via E-Commerce orders, as soon as a customer places an order online, the information is passed along via the host computer/ERP system to the WMS. All necessary steps to manage the order (e.g. pick the ordered items etc.) are then processed within the WMS. Afterwards, information is sent back to the ERP system to support financial transactions, advance shipping notifications to customers, inventory management, etc.

As the orders from the WMS accrue they are held in an order queue in the WMS or order data from the WMS may be provided to a separate software system (e.g. an order server) wherein an order queue may be established and the orders assigned to robots for execution within the warehouse. Each order will include one or more item(s) located in the warehouse. The robot will navigate to the locations of the various items in the assigned order and at each location a human operator may assist the robot in executing the task of physically removing an item from a shelf and placing it on robot, for example, in a tote.

Once the robot arrives at the location of an item in its order, it may communicate, e.g. via light signaling, that it is in need of assistance by an operator in order to execute a function on the item. Once an operator arrives at the robot, the robot may communicate information about the item to be selected by the operator via a tablet (or laptop/other user input/output device), which the operator can read, or by transmitting the order to a handheld device used by the local operator. The operator will then assist robot in executing the function, e.g. a pick function which involves retrieving the item, scanning the item barcode and then placing the item on the robot. Then the robot may then make its way to another location to pick up its next item in the order.

A critical part of making the above described process efficient is ensuring that an operator is positioned near the robot when it arrives at a location near the item(s) in the order. Typically, the robot or the order server will determine an optimized route for the robot to take to most efficiently navigate to each of the items in its order. However, when the robot arrives at the locations of the items in its order, and operators are not present to assist the robot, then the robot's overall efficiency in executing the order will be reduced.

There is therefore a need for a system and method for increasing the likelihood of having an operator present at the locations of the items in the order, so that the robots may be promptly assisted. It should be noted that the above described problem not only applies to pick functions, but it applies also to executing other functions, including placing items or performing maintenance functions on items.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect, the invention includes a method for executing orders assigned to a plurality of robots operating in a warehouse, wherein the robots interact with a warehouse management system to execute orders with the assistance of a plurality of operators, each order including a plurality of items and each item being located in the warehouse. The method includes receiving, by a robot of the plurality of robots, an order to be executed by the robot, the order including a plurality of items, each item associated with an item location in the warehouse. The method also includes defining a plurality of regions within the warehouse and identifying the regions of the plurality of regions which include at least one item location associated with an item in the order received by the robot. The method further includes determining, from the regions identified to include at least one item location associated with an item in the order received by the robot, the regions which include at least one operator of the plurality of operators. The method additionally includes assessing criteria relating to a current location of the robot and to the item locations associated with the regions in which are located at least one operator and selecting an item location of an item in the order to which the robot is to navigate from a current location. The step of selecting is based on an assessment of the criteria relating to the current location of the robot and to the item locations associated with the regions in which are located at least one operator.

In other aspects of the invention, one or more of the following features may be included. Executing orders may include performing one or more of a pick, a place or a maintenance function on the items in the orders. The step of assessing a criteria may include assessing one or both of a distance of travel or a travel time between the current location of the robot and each of the item locations associated with the regions in which are located at least one operator. The robot may determine an initial order execution sequence for the plurality of items in each order and wherein the step of assessing a criteria may further include assessing one or more of the order in the order sequence of each item in a region in which are located at least one operator, or the distance of travel or the travel time between the current location of the robot and each of the item locations associated with the regions in which are located at least one operator robot. The step of selecting the item location to which the robot is to navigate may be based on the shortest travel distance or shortest travel time between the current location of the robot and each of the item locations associated with the regions in which are located at least one operator robot. The step of assessing may include determining the item locations which are within a predetermined distance or travel time between the current location and the respective item locations; and the step of selecting the item location to which the robot is to navigate may be determined based on which of the item locations within the predetermined distance or travel time are next in order in the initial order execution sequence. The step of selecting the item location to which the robot is to navigate may be determined based in part on one or both of a region of the plurality of regions which has a higher number of operators or a higher operator to robot ratio.

In another aspect, the invention features a robot configured to execute orders assigned by a warehouse management system, each order including a plurality of items and each item being located at an item location within one of a plurality of regions in a warehouse. The robot includes a mobile base, a communication device enabling communication between the robot and the warehouse management system and a processor and memory, responsive to communications with the management system. The processor and memory are configured to receive an order to be executed by the robot, the order including a plurality of items, each item associated with an item location in the warehouse. The processor and memory are also configured to identify one or more regions of the plurality of regions which include at least one item location associated with an item in the order received by the robot and to determine, from the one or more regions identified to include at least one item location associated with an item in the order received by the robot, the region or regions which include at least one operator of the plurality of operators. The processor and memory are further configured to assess criteria relating to a current location of the robot and to the item locations associated with the one or more regions in which are located at least one operator and to select an item location of an item in the order to which the robot is to navigate from a current location. The selection is based on an assessment of the criteria relating to the current location of the robot and to the item locations associated with the one or more regions in which are located at least one operator.

In yet further aspects of the invention, one or more of the following features may be included. Executing orders may include performing one or more of a pick, a place or a maintenance function on the items in the order. The processor and memory may be configured to the assess one or both of a distance of travel or a travel time between the current location of the robot and each of the item locations associated with the one or more regions in which are located at least one operator. The processor and memory may be configured to determine an initial order execution sequence for the plurality of items in each order and to assess assessing one or more of the order in the order sequence of each item in the one or more regions in which are located at least one operator, or the distance of travel or the travel time between the current location of the robot and each of the item locations associated with the one or more regions in which are located at least one operator robot. The processor and memory may also be configured to select the item location to which the robot is to navigate based on the shortest travel distance or shortest travel time between the current location of the robot and each of the item locations associated with the one or more regions in which are located at least one operator robot. The processor and memory may further be configured to determine the item locations which are within a predetermined distance or travel time between the current location and the respective item locations and to select the item location to which the robot is to navigate based on which of the item locations within the predetermined distance or travel time are next in order in the initial order execution sequence. The processor and memory may additionally be configured to select the item location to which the robot is to navigate based in part on one or both of a region of the plurality of regions which has a higher number of operators or a higher operator to robot ratio.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 6 is a table of the fiducial identification to pose mapping;

FIG. 7 is a table of the bin location to fiducial identification mapping;

DETAILED DESCRIPTION OF INVENTION

Figure 1:
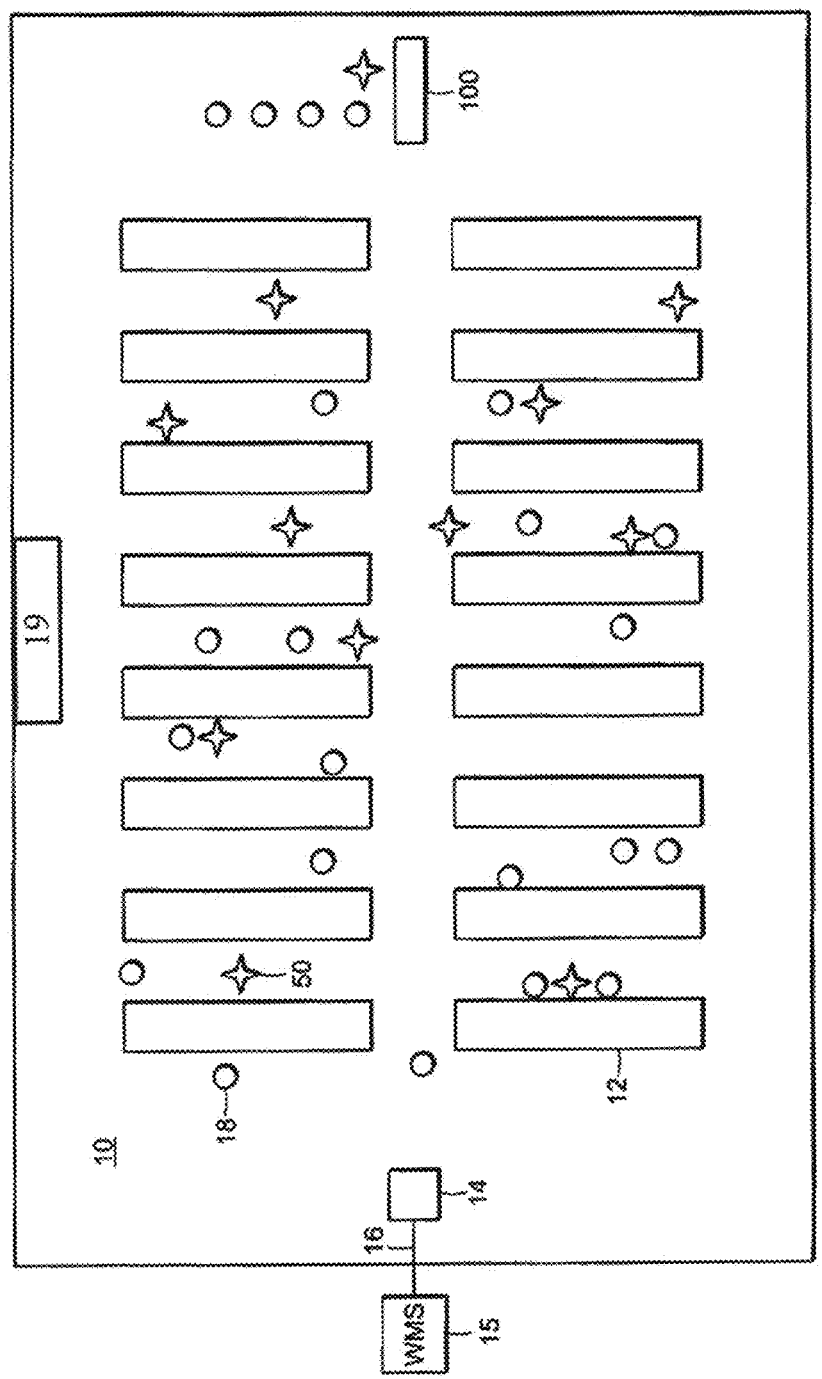
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The disclosure is directed to a system and method for adjusting the sequence of executing functions on items in an order based on operator location, which may be applied to an order fulfillment operation in a warehouse using autonomous mobile robots or "AMRs" in order to increase efficiency and productivity. A specific AMR implementation is described herein, but it is only to provide context for the system and method for adjusting the sequence of executing functions on items in an order according to this invention. Moreover, the implementation described herein is focused on the AMRs executing the pick function; however, the system and method for adjusting the sequence of executing functions on items in an order based on operator location described herein is applicable to any function the robots may be executing, including but not limited to placing items and performing maintenance functions on the items.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18, e.g. wirelessly, for execution. The induction process according to an aspect of this invention will be described in more detail below.

It will be understood by those skilled in the art that order server 14 may be a separate server with a discrete software system configured to interoperate with the WMS server 15 and WMS software or the order server functionality may be integrated into the WMS software and run on the WMS server 15.

Figure 2A:
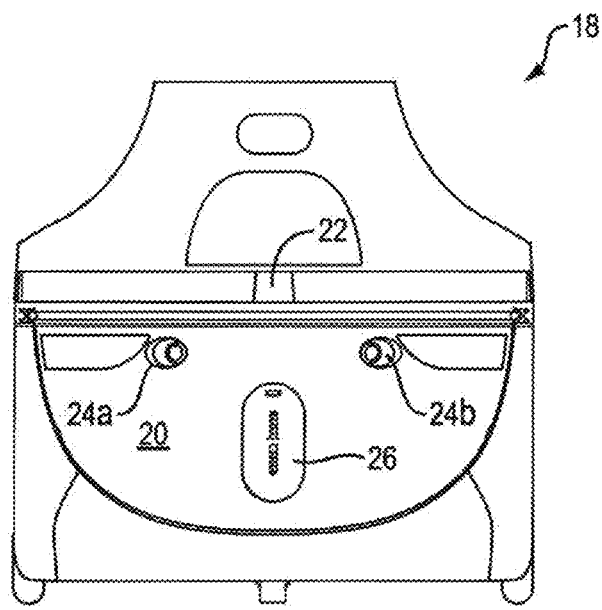
FIG. 2A is a front elevational view of a base of one of the robots used in the warehouse shown in FIG. 1.
Figure 2B:
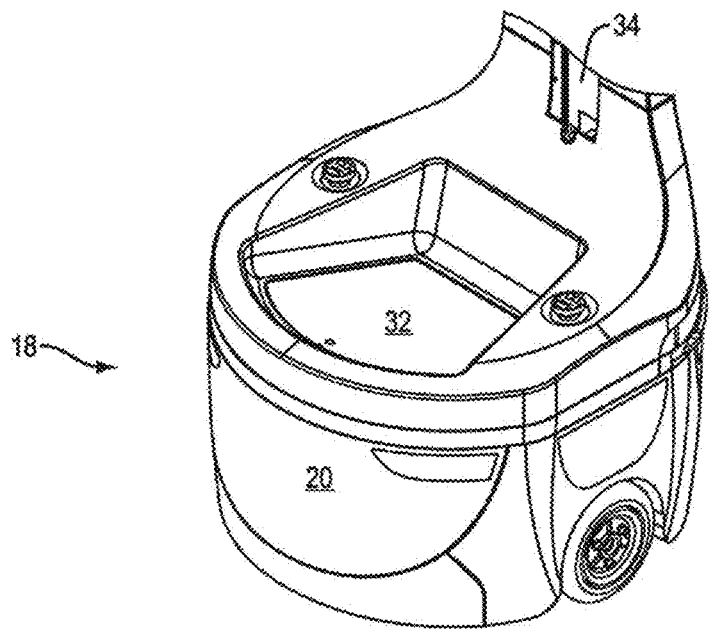
FIG. 2B is a perspective view of a base of one of the robots used in the warehouse shown in FIG. 1.
Figure 3:
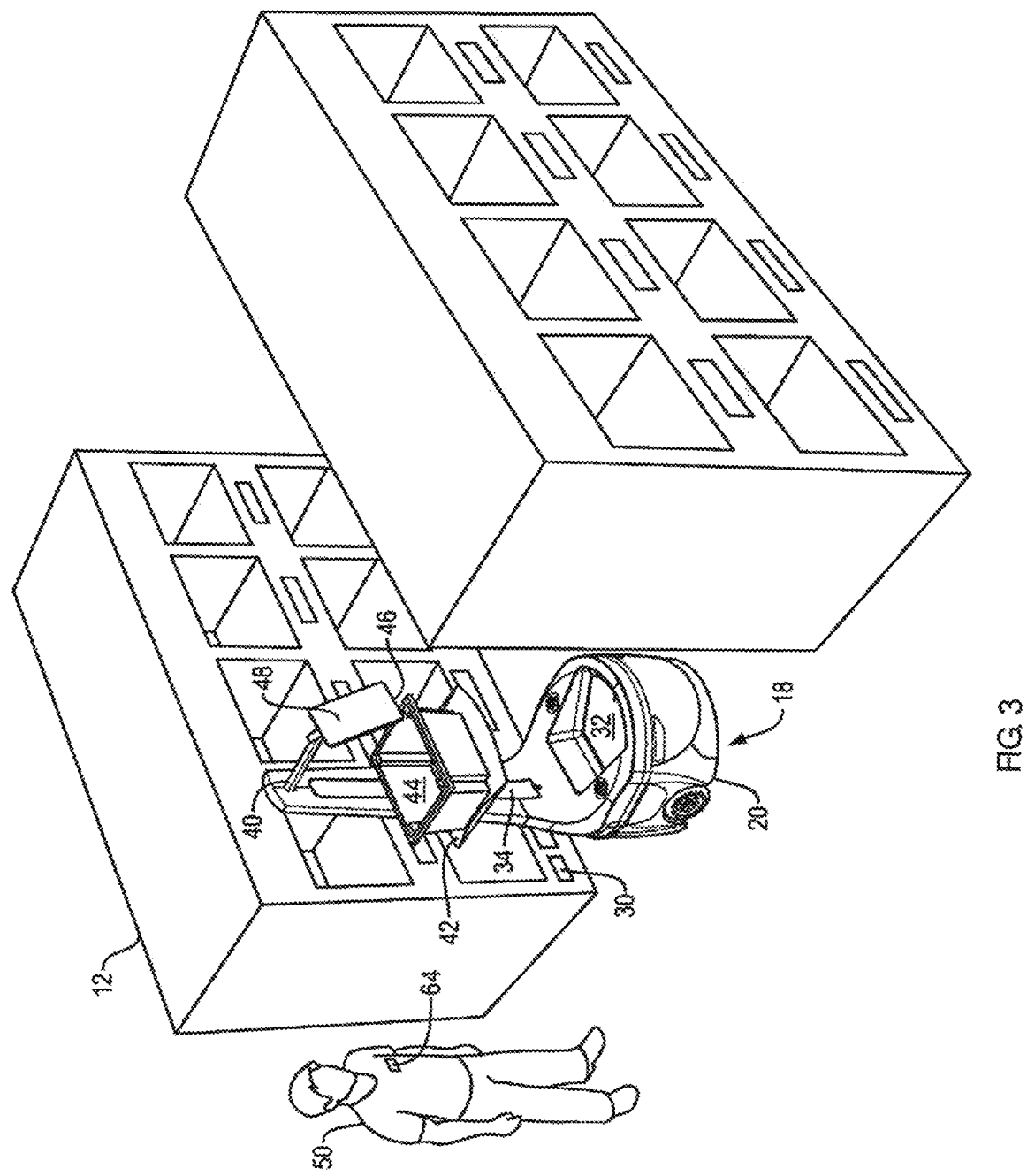
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for recharging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8.

Fiducial markers are also used to identify processing stations (including induction stations) and the navigation to such processing station fiducial markers may be the same as the navigation to the bin/location of items ordered. It should be noted that the navigation approach described herein is only exemplary and any other applicable navigation approach may be used.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not adept enough to quickly and efficiently pick items from a shelf and place them in the tote 44. Currently, a more efficient way of picking items is to use a local operator 50, which is typically human, to carry out the task of physically removing an ordered item from a shelf 12 and placing it on robot 18, for example, in tote 44. The robot 18 communicates the order (i.e. the individual item(s) to select) to the local operator 50 via the tablet 48 (or laptop/other user input/output device), which the local operator 50 can read, or by transmitting the order to a handheld device used by the local operator 50. Alternatively, the local operator 50 may be a robotic device that may be used to remove items from the shelves and place them on robots 18 performing a pick function and, vice versa, remove the items from robots 18 and place them in the appropriate locations on the shelves performing a place or put-way function.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored, communicates the item information to the local operator 50, and waits (or dwells) for a local operator 50 to retrieve the item from the shelf 12 and place it in tote 44. If robot 18 has other items to retrieve, it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. It should be noted that this is an exemplary navigation approach described herein and that any suitable navigation approach may be used in conjunction with system and method for adjusting the sequence of executing functions on items in an order based on operator location described herein.

Using one or more robots 18, a map of the warehouse 10 must be created and dynamically updated to determine the location of objects, both static and dynamic, as well as the locations of various fiducial markers dispersed throughout the warehouse. One or more of the robots 18 navigate the warehouse and build/update a map 10a, FIG. 4, utilizing its laser-radar 22 and simultaneous localization and mapping (SLAM), which is a computational method of constructing or updating a virtual map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as robot 18 travels throughout the space identifying open space 112, walls 114, objects 116, and other static obstacles such as shelves 12a in the space, based on the reflections it receives as the laser-radar scans the environment.

Figure 4:
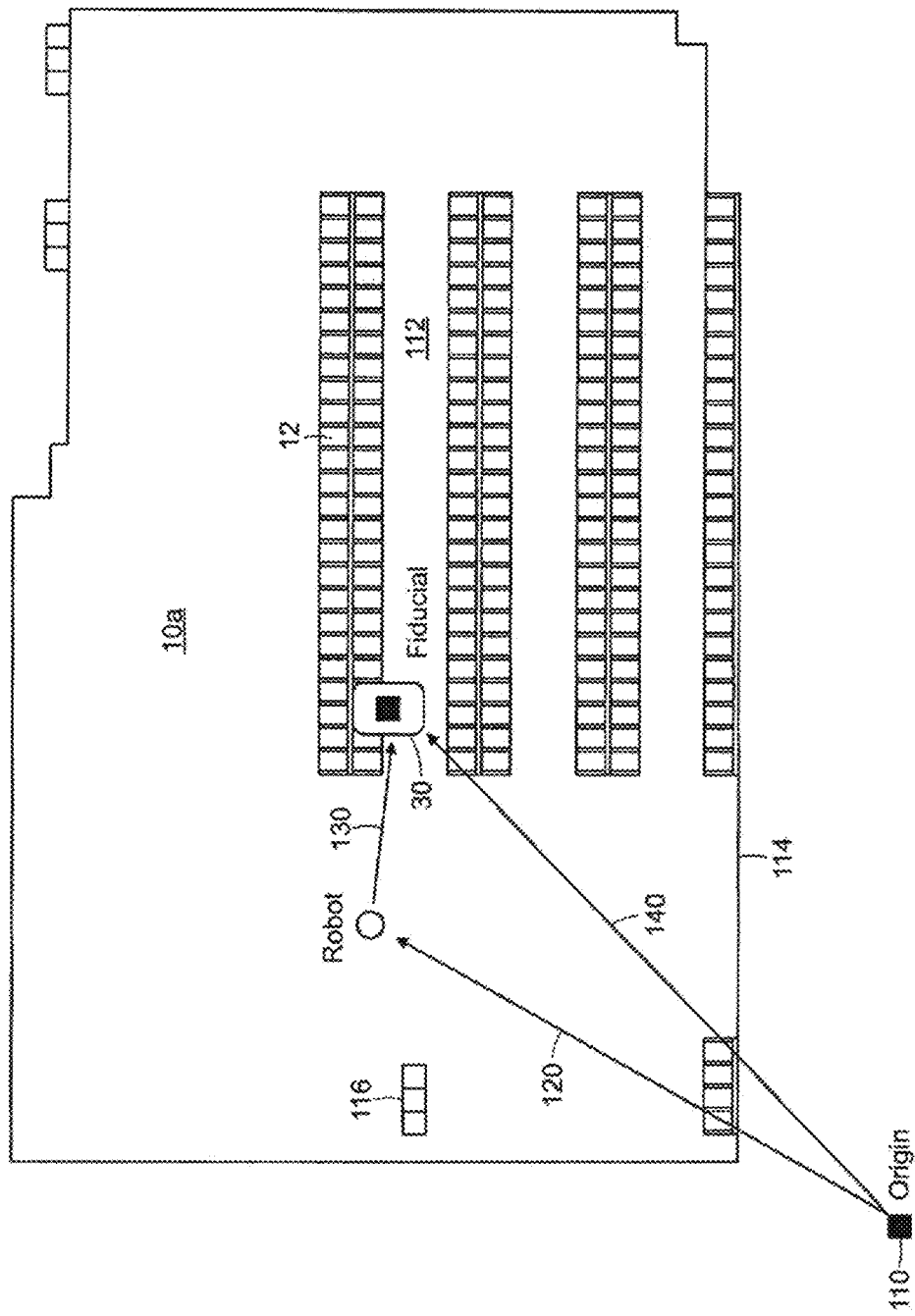
FIG. 4 is a partial map of the warehouse of FIG. 1 created using laser radar on the robot.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS. 3 and 4, is located by robot 18 using its cameras 24a and 24b, the location in the warehouse relative to origin 110 is determined. By using two cameras, one on either side of robot base, as shown in FIG. 2A, the robot 18 can have a relatively wide field of view (e.g. 120 degrees) extending out from both sides of the robot. This enables the robot to see, for example, fiducial markers on both sides of it as it travels up and down aisles of shelving.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose, which comprises its position (x, y, z coordinates) in the warehouse along with its orientation or quaternion (x, y, z, w) for fiducial marker 30 can be determined. It should be noted that the coordinates may only include x and y coordinates as the fiducial pose is typically located on the floor and thus the z coordinate is zero.

Figure 5:
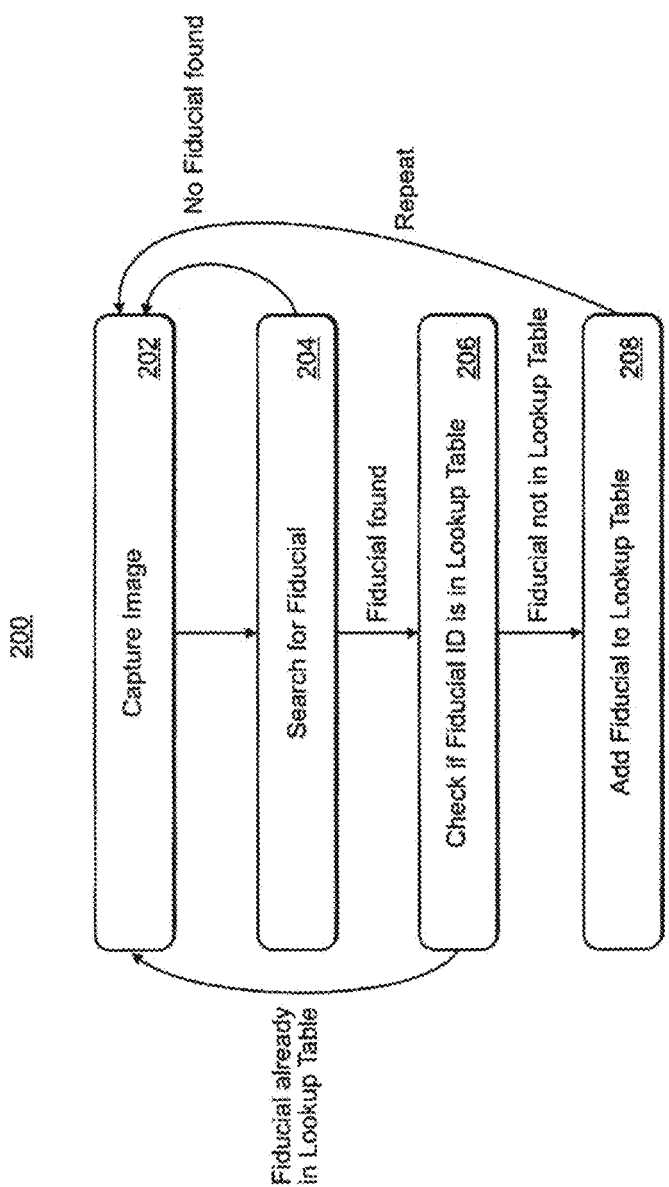
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24a and 24b captures an image and in step 204 searches for fiducial markers within the captured images. In step 206, if a fiducial marker is found in the image (step 204) it is determined if the fiducial marker is already stored in fiducial table 300, FIG. 6, which may be located in memory 34 of robot 18 and/or in the warehouse management system 15. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot and/or in the warehouse management system 15, there are included for each fiducial marker, a fiducial identification, 1, 2, 3, etc., and a pose for the fiducial marker/bar code associated with each fiducial identification. As indicated above, the pose consists of the x,y,z coordinates in the warehouse along with the orientation or the quaternion (x,y,z, ω).

In another look-up Table 400, FIG. 7, which may also be stored in the memory of each robot and/or in the warehouse management system 15, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19 and processing station 100, FIG. 1, may also be stored in table 400 and correlated to fiducial IDs. From the fiducial IDs, the poses of the charging station and processing station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, robot 18 can determine the pose of the fiducial ID using the information in table 300, FIG. 6, and then navigate to the pose as described herein.

Figure 8:
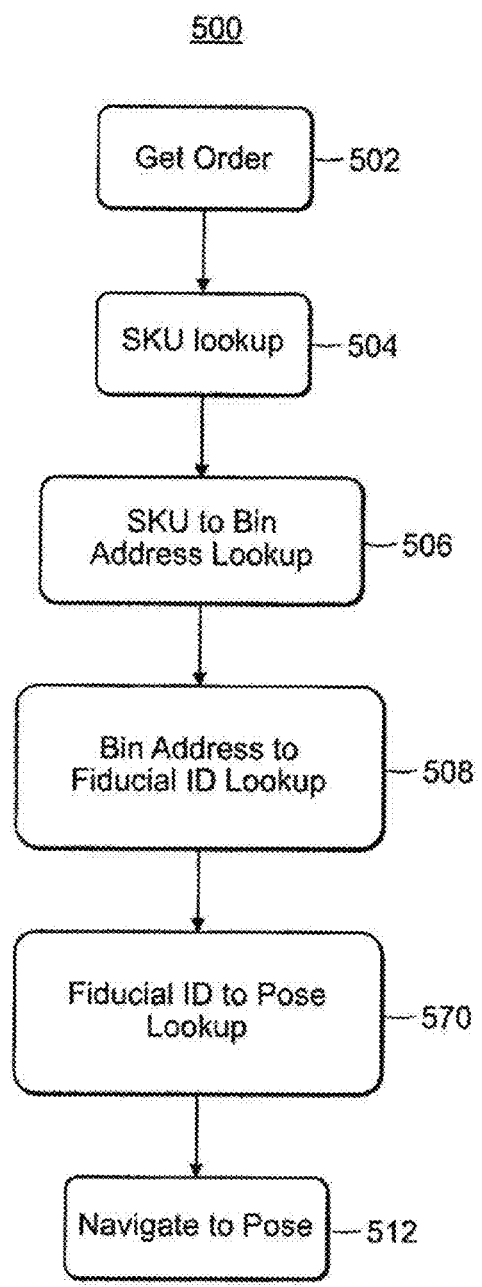
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10a is achieved by many-to-many multiresolution scan matching (M3RSM) operating on the SLAM virtual map. Compared to brute force methods, M3RSM dramatically reduces the computational time for a robot to perform SLAM loop closure and scan matching, two critical steps in determining robot pose and position. Robot localization is further improved by minimizing the M3 SRM search space according to methods disclosed in related U.S. application Ser. No. 15/712,222, entitled Multi-Resolution Scan Matching with Exclusion Zones, filed on Sep. 22, 2017 and incorporated by reference in its entirety herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker. ORCA optimally avoids collisions with other moving robots without requiring communication with the other robot(s). Navigation proceeds as a series of incremental movements along trajectories computed at the approximately 50 ms update intervals. Collision avoidance may be further improved by techniques described in related U.S. application Ser. No. 15/712,256, entitled Dynamic Window Approach Using Optimal Reciprocal Collision Avoidance Cost-Critic, filed on Sep. 22, 2017 and incorporated by reference in its entirety herein.

Figure 9:
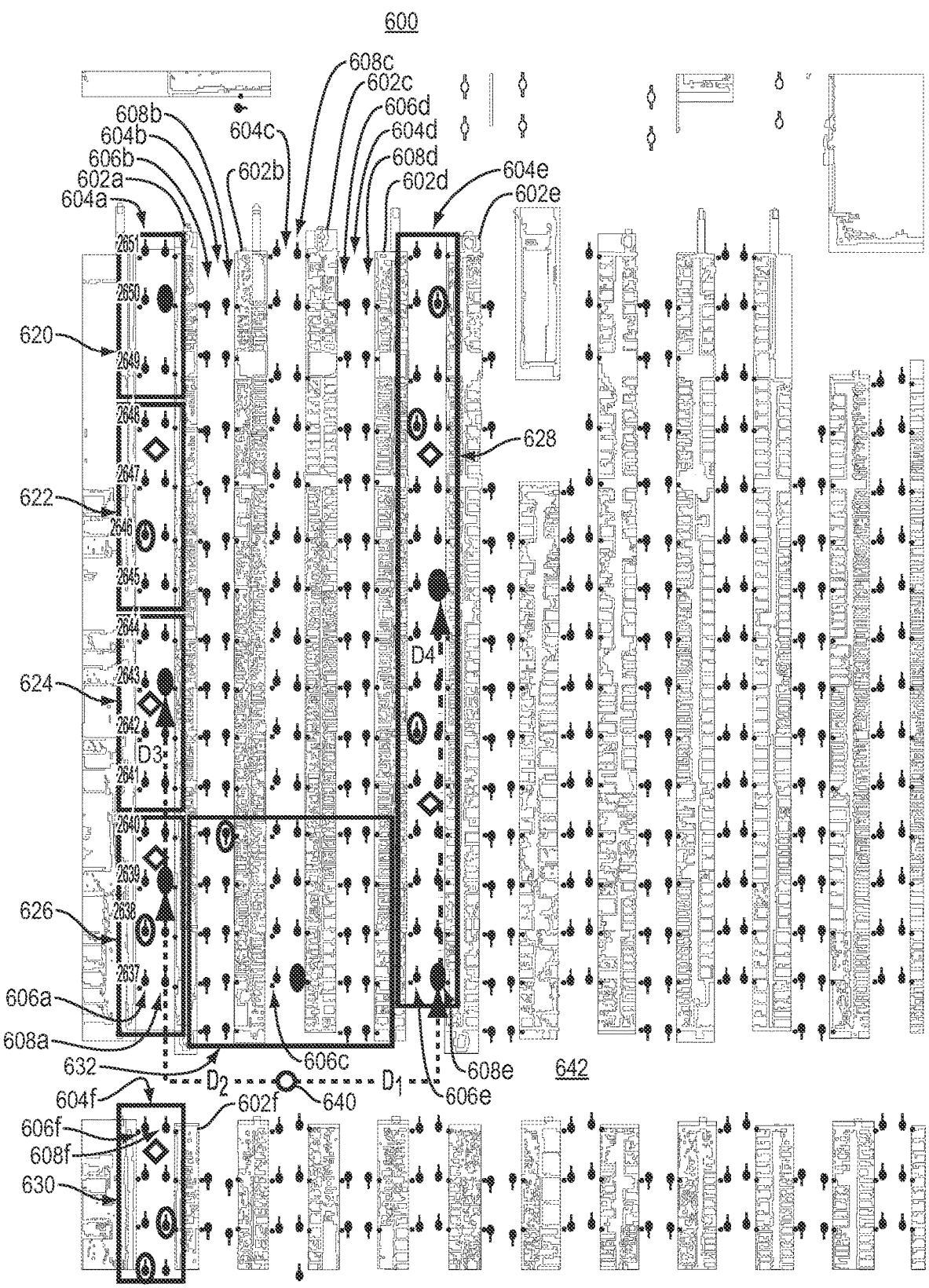
FIG. 9 is an image of a top plan view of a portion of an order-fulfillment warehouse depicting robots, operators and active item locations in the warehouse.

Referring to FIG. 9, an image 600 of a typical order-fulfillment warehouse depicts a plurality of shelves including, for example, shelves 602a-602f, filled with the various items that could be included in a customer order. Between shelving units 602a-602f are aisles 604a-604f and on each side of and extending down the aisles along the faces of the shelving units are a first plurality of item locations 606a-606f (i.e. poses). Opposite the first plurality of item locations, are a second plurality of item locations 608a-608f. As described above, each item location/pose is associated with a fiducial marker having a fiducial identification. The fiducial markers/identifications are indicated by numbered points located adjacent to the item locations/poses, e.g. numbers 2637-2651 adjacent to poses 606a in aisle 604a.

When an order is placed, the SKUs of the items in the order is/are determined by the warehouse management system 15, FIG. 1, and from the SKUs, the bin location(s) is/are determined. The bin locations are the physical spaces or containers in which the items are stored on the shelves. From there, the bin locations are correlated to fiducial ID's and from the fiducial ID's, the pose or item location of each fiducial ID is obtained. Thus, each SKU corresponding to an item in an order is mapped to an item location/pose and the robot navigates to the item location/pose to arrive proximate the item.

The robots will typically have a plurality of items in an individual order and may be assigned multiple orders at a time. The robot may then select an optimized sequence or order of picking (or executing other functions such as put-away or maintenance) the items based on the pose locations of the various items in the order to increase efficiency. The order of the items may be selected to minimize overall distance travelled, eliminate backtracking, or to take a certain pre-defined route through the warehouse, for example. Establishing the initial/optimized order sequence is outside the scope of this invention and is therefore not described in detail.

In image 600, the item locations or poses of items that are currently part of one of the orders being executed by a robot are identified as so-called "active" item locations or poses. In this example, these active locations are indicated by a circle around the pose, with either an uncolored middle or a middle filled in with a color such as black. This could be represented by using other geometric shapes or by highlighting the active locations with a particular color, or in any other desired way. Also shown are a number of operators, each indicated by a diamond shaped designation, dispersed throughout the warehouse to service robots in picking items from the shelves. In this example, only active locations and operators in certain portions of aisles 604a-f are shown, as this limited region is the focus of this example. It will be understood that other operators and active locations would be dispersed in locations throughout the warehouse.

When a robot is inducted with one or more orders, an initial pick sequence for the robot is established for items in the orders, based on the locations of the items in the warehouse. Any suitable algorithm for setting the pick sequence may be used. However, as the robot travels the warehouse executing its orders according to the initial pick sequence, there may be situations when there are either no or a limited number of operators in the area of an next item location to which the robot is navigating. If the robot were to simply continue to the next item location, this may result in delays. Even in situations where there are one or more operators in a given area, but there are also a number of other robots needing service, the robot may experience service delays. Such delays may be longer than desirable and when multiplied across many robots and over longer periods of time this may have an undesirable effect on overall warehouse efficiency. With the current invention, the proximity of operators to item locations for items in the orders assigned to a robot are assessed and utilized to redirect the robot to items out of its initial, assigned sequence in order to improve efficiency.

According to an aspect of the invention, the initial sequence for items in the order(s) may be adjusted to ensure the presence of operators at item locations. Continuing to refer to FIG. 9, the warehouse may be divided into a plurality of regions. The regions may be established in various ways, including within an aisle of the warehouse or across multiple aisles. Within an aisle there may be established one region running the length of the aisle or an aisle may be divided into multiple regions along its length. Depending on the size and configuration of the warehouse a region may span more than one aisle. As depicted in aisle 604a, there may be established multiple regions. In this example aisle 604a is divided into four regions; namely, regions 620, 622, 624, and 626 along its length. Of course, this aisle may be divided into more or fewer regions. In contrast, aisles 604e forms a single region. Aisle 604f is much shorter than aisles 604a-604e, yet it may be divided into more than one region. In this example, only region 630 is shown. Spanning the bottom portion of aisles 604b through 604d is region 632. The regions of a given warehouse would typically be divided into uniform sizes; however, in this example different size and type regions are shown for illustration purposes.

Certain regions like 620 and 632 include active item locations but do not include any operators to service robots at the item locations. Other regions like 622, 624, 626, and 630 include one or more active item locations and one or more operators. To simplify the description of an aspect of the invention, we have not shown any robots in the plurality of regions or in other parts of the warehouse and only depict a single robot 640 in a main, horizontally oriented aisle 642, which aisle traverses across the ends of longer, vertically oriented aisles, such as 604a-e, and the shorter aisles, such as 604f Of course, under normal conditions, multiple robots would be operating in various locations throughout the warehouse. The active item locations associated with items in the order(s) of robot 640 are depicted as black circles. The other active item locations are associated with orders of other robots (not shown) in the warehouse and are depicted as circles without a colored middle.

Figure 10:
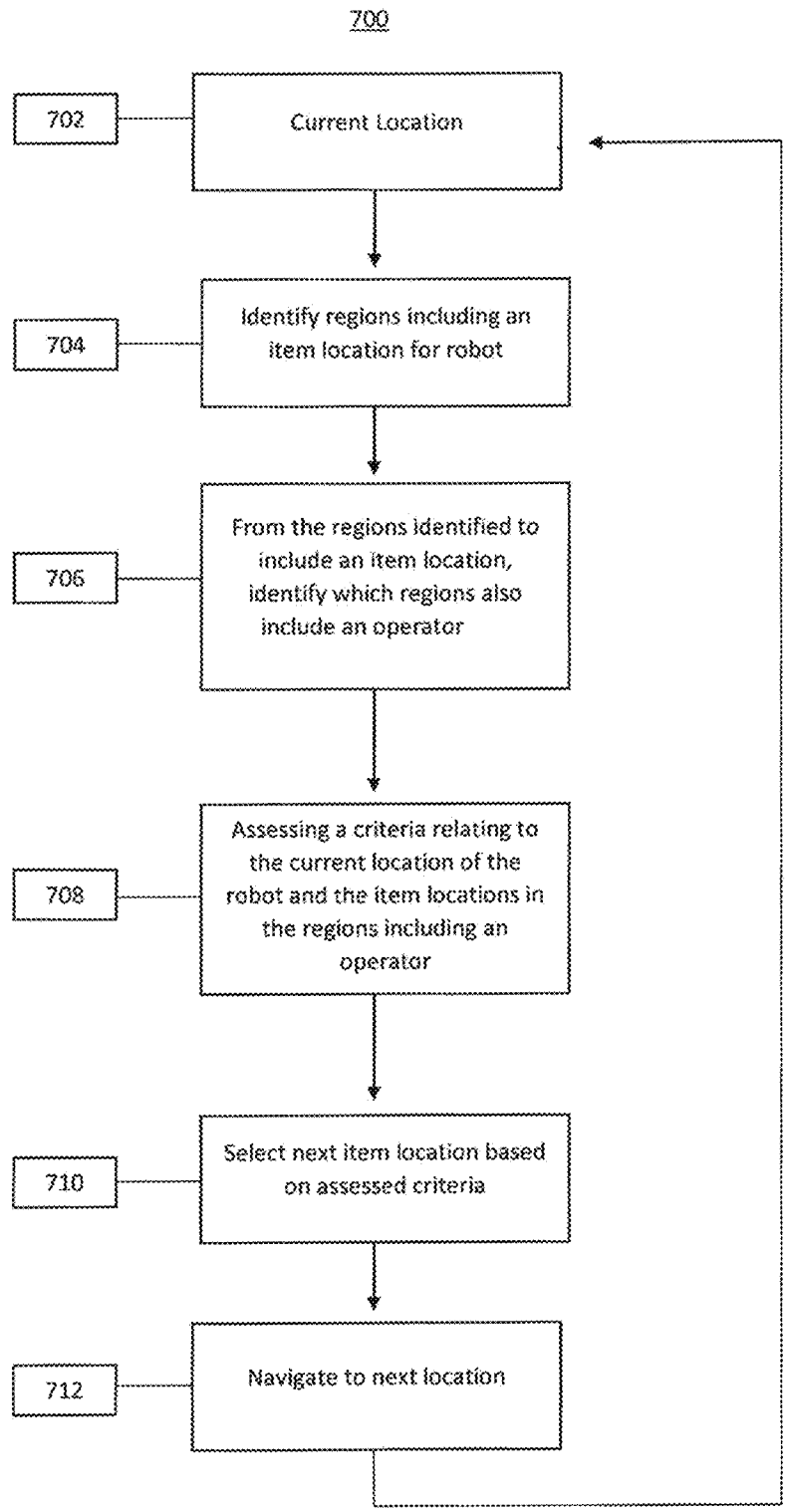
FIG. 10 is a flow chart describing an implementation of an item sequence adjustment algorithm according to an aspect of this invention.

Referring to FIG. 10, a flow chart 700 depicts the operation of an algorithm, according to an aspect of the invention, for selecting the next item location to proceed to for executing an order based on operator location. While at a current location, step 702, robot 640 determines which active item location to proceed to next by first identifying at step 704 the regions which include at least one item location associated with an item in the order(s) being executed by robot 640. In the example shown in FIG. 9, the regions are 620, 624, 626, 628, and 632, as indicated by the black circles in each of the regions. At step 706, from the regions identified to include at least one item location associated with an item in the order received by the robot, the regions which include at least one operator of the plurality of operators are determined In the example, the regions including an operator are regions 624, 626, and 628.

For each item location, criteria relating to a current location of robot 640 and to item locations are assessed in step 708. The criteria may include, for example, the distance of travel between the current location of robot 640 and the item locations of items in regions with operators. Continuing with the example, the distances from robot 640 to the item locations in each of regions 624, 626, and 628 (two items) may be determined to be $D_1$, $D_2$, $D_3$, $D_4$.

In step 710, the item location of an item in the order to which the robot is to navigate from the current location may be selected based on an assessment of the criteria relating to the current location of the robot and to the item locations associated with the regions in which are located at least one operator. In order to optimize efficiency and ensure that the robots execute orders in the shortest time possible, the next item location may be selected to be the closest to the current location in a region having an operator. This should allow the robot to arrive at the next location in the shortest time relative to the other item locations. Thus, distances $D_1$, $D_2$, $D_3$, and $D_4$ are assessed and $D_1$ is determined to be the shortest distance. Therefore, $D_1$ is selected as the next item location to which robot 640 will navigate.

Certain thresholds may be set such that the system does not even consider item locations or regions if they are greater than a certain distance or travel time away. It should be noted that the nearest item location for robot 640 is in aisle 604d in region 632. While this item location is closer than the other item locations it is not considered, as there are no operators present in region 632. Since there are no operators in the region, the amount of wait time expected for an operator to arrive is assumed to be greater than the additional time to travel the other, further away item locations.

In step 712, the robot navigates to the next item location and when at the next item location the robot waits for the operator to execute the order at the location, e.g. perform a pick function on the item associated with the item location. This location is then the "current location" of the robot, step 702, and the system continues with the process until all of the orders have been executed.

Other criteria besides distance may be used to assess the item locations. They may include, for example, travel time, number of operators in each region, number of active locations in each region, and the number in the original sequence of its order. In the case of travel time, this may provide a better assessment of how quickly robot 640 may arrive at each item location as compared to using just distance. This is because in certain portions of the warehouse speed limits and/or required stops may be implemented, which could result in the robot arriving at an item location which is further in distance from other locations but takes less time to reach.

In addition, when the distance or travel time is comparable between multiple item locations, the original item sequence in the order(s) may be considered. For example, one item, which may be the same distance or slightly further away from the robot than another item, may be prioritized over the other due to its earlier position in the original item sequence. For example, item 3 of 7 in the original item sequence may be prioritized over item 4 of 7 in the original item sequence when the two items are substantially the same travel distance or travel time from the current location as there may be an overall advantage to maintaining, as much as possible, the original item sequence.

In an alternative embodiment, one region may be prioritized over another region in various ways, including selecting one item location over another item location which are comparable distances/travel when a region has a higher number of operators or a the higher operator to robot ratio or a combination of both. These factors may decrease the time it takes for the robot to have the function executed at the item location. Referring to FIG. 9, active locations in region 628 may be prioritized over active regions in region 626 since there are two operators in region 628 as compared to the one operator in region 626. For example, even if the distance to the active location in region 626 were the same or shorter (by a predetermined amount) than an active location in region 628, the active location in region 628 may be selected as the next location since there are more operators.

Notwithstanding the above described process of adjusting the pick sequence of the robot to regions with operators, there may be situations where it is undesirable and inefficient to direct the robot to locations where there is too much congestion. In order to avoid this, the robot may communicate with a robot monitoring server that tracks congestion based on clusters of robots or operators within the navigational space to improve navigation efficiency. Where the clusters becomes too concentrated, a congested area can form, which can cause operators and robots to impede passage and travel speed of other operators and robots, causing inefficient delays and increasing collision risk.

In the case where the algorithm described above with regard to FIGS. 9 and 10, directs the robot to an item in a region with too much congestion, the robot's route may be further adjusted to avoid such congestion. An example of a congestion management approach is described in the following commonly owned patent application, which is incorporated herein in its entirety: U.S. application Ser. No. 16/265,703, filed Feb. 1, 2019, entitled Robot Congestion Management.

Non-Limiting Computing Device Examples

Figure 11:
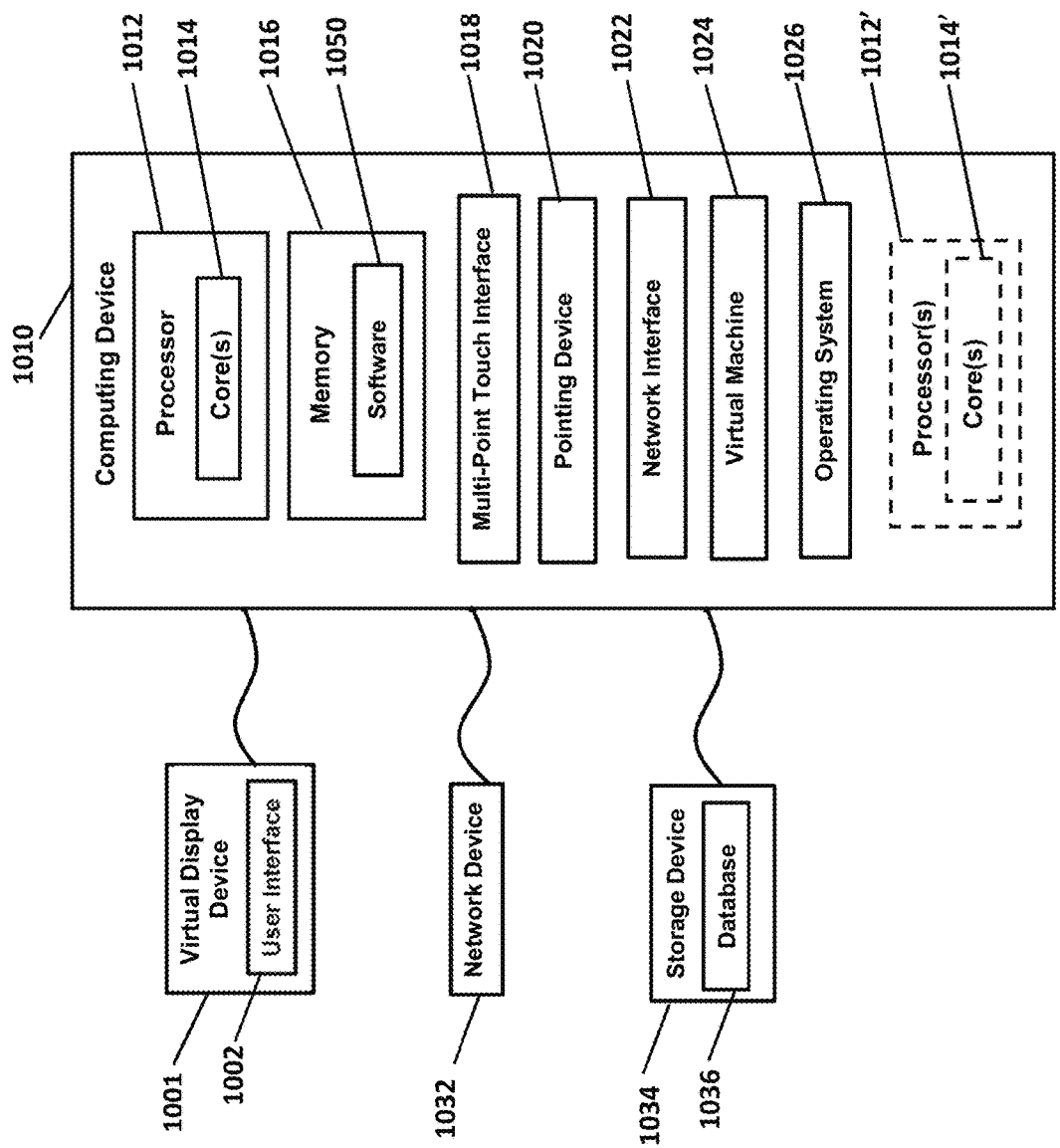
FIG. 11 is a block diagram of an exemplary computing system.

The above described systems and software for the robot and the WMS may be implemented various ways. In FIG. 11 is a block diagram of an exemplary computing device 1010 such as may be used, or portions thereof, in accordance with various embodiments as described above with reference to FIGS. 1-10. The computing device 1010 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1016 included in the computing device 1010 may store computer-readable and computer-executable instructions or software for performing the operations disclosed herein. For example, the memory may store software application 1040 which is programmed to perform various of the disclosed operations as discussed with respect to FIGS. 1-15. The computing device 1010 may also include configurable and/or programmable processor 1012 and associated core 1014, and optionally, one or more additional configurable and/or programmable processing devices, e.g., processor(s) 1012' and associated core (s) 1014' (for example, in the case of computational devices having multiple processors/cores), for executing computer-readable and computer-executable instructions or software stored in the memory 1016 and other programs for controlling system hardware. Processor 1012 and processor(s) 1012' may each be a single core processor or multiple core (1014 and 1014') processor.

Virtualization may be employed in the computing device 1010 so that infrastructure and resources in the computing device may be shared dynamically. A virtual machine 1024 may be provided to handle a process running on multiple processors so that the process appears to be using only one computing resource rather than multiple computing resources. Multiple virtual machines may also be used with one processor.

Memory 1016 may include a computational device memory or random access memory, such as but not limited to DRAM, SRAM, EDO RAM, and the like. Memory 1016 may include other types of memory as well, or combinations thereof.

A user may interact with the computing device 1010 through a visual display device 1001, 111A-D, such as a computer monitor, which may display one or more user interfaces 1002 that may be provided in accordance with exemplary embodiments. The computing device 1010 may include other I/O devices for receiving input from a user, for example, a keyboard or any suitable multi-point touch interface 1018, a pointing device 1020 (e.g., a mouse). The keyboard 1018 and the pointing device 1020 may be coupled to the visual display device 1001. The computing device 1010 may include other suitable conventional I/O peripherals.

The computing device 1010 may also include one or more storage devices 1034, such as but not limited to a hard-drive, CD-ROM, or other computer readable media, for storing data and computer-readable instructions and/or software that perform operations disclosed herein. Exemplary storage device 1034 may also store one or more databases for storing any suitable information required to implement exemplary embodiments. The databases may be updated manually or automatically at any suitable time to add, delete, and/or update one or more items in the databases.

The computing device 1010 may include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 may include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 may be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 may run any operating system 1026, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, iOS or any embedded operating system, any real-time operating system, any open source operating system, any proprietary operating system, or any other operating system capable of running on the computing device and performing the operations described herein. In exemplary embodiments, the operating system 1026 may be run in native mode or emulated mode. In an exemplary embodiment, the operating system 1026 may be run on one or more cloud machine instances.

Figure 12:
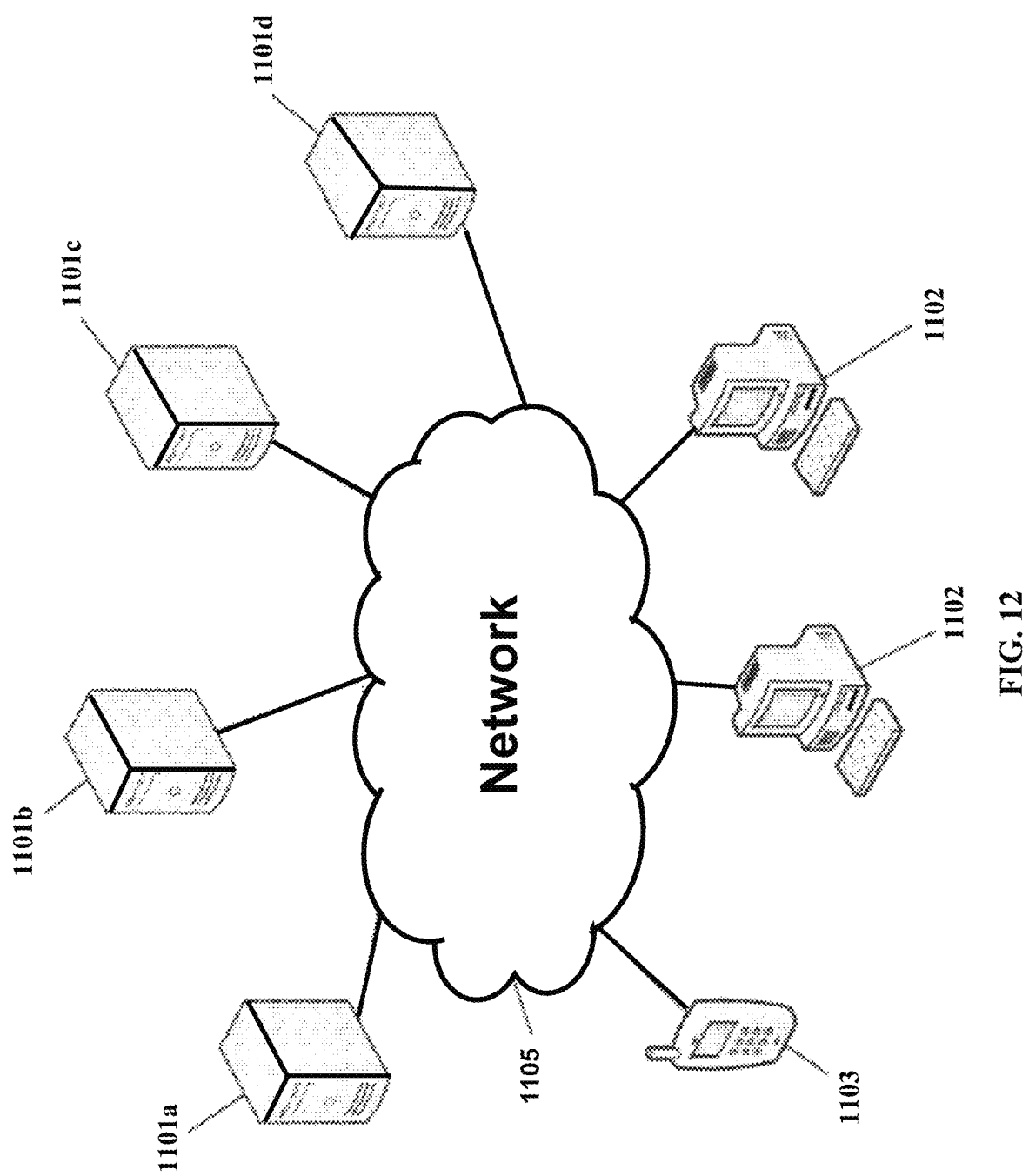
FIG. 12 is a network diagram of an exemplary distributed network.

FIG. 12 is an example computational device block diagram of certain distributed embodiments. Although FIGS. 1-11, and portions of the exemplary discussion above, make reference to a warehouse management system 15 or an order-server 14 each operating on an individual or common computing device, one will recognize that either of the warehouse management system 15 or the order-server 14 may instead be distributed across a network 1105 in separate server systems 1101a-d and possibly in user systems, such as kiosk, desktop computer device 1102, or mobile computer device 1103. For example, the order-server 14 and/or the zone server may be distributed amongst the tablets 48 of the robots 18. In some distributed systems, modules of any one or more of the warehouse management system software, the order-server software, and the zone engine may be separately located on server systems 1101*a-d* and may be in communication with one another across the network 1105.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by letters patent is:

We claim:

1. A method for executing orders assigned to a plurality of robots operating in a warehouse, wherein the robots interact with a warehouse management system to execute orders with the assistance of a plurality of operators, each order including a plurality of items and each item being located in the warehouse, the method comprising:

receiving, by a robot of the plurality of robots, an order to be executed by the robot, the order including a plurality of items, each item associated with an item location in the warehouse;

defining a plurality of regions within the warehouse;

identifying the regions of the plurality of regions that include at least one item location associated with an item in the order received by the robot;

determining, from the regions identified to include at least one item location associated with an item in the order received by the robot, the regions that include at least one operator of the plurality of operators;

assessing criteria relating to a current location of the robot and to the item locations associated with the regions in which are located at least one operator;

selecting an item location of an item in the order to which the robot is to navigate from a current location; the step of selecting being based on an assessment of the criteria relating to the current location of the robot and to the item locations associated with the regions in which are located at least one operator;

wherein the step of assessing criteria includes assessing one or both of a distance of travel or a travel time between the current location of the robot and each of the item locations associated with the regions in which are located at least one operator; and wherein the step of selecting the item location to which the robot is to navigate is determined based in part on one or both of a region of the plurality of regions that have a higher number of operators or a higher operator to robot ratio.

2. The method of claim 1 wherein executing orders includes performing one or more of a pick, a place or a maintenance function on the items in the orders.

3. The method of claim 1 wherein the robot determines an initial order execution sequence for the plurality of items in each order and wherein the step of assessing a criteria further includes assessing one or more of the order in the order sequence of each item in a region in which are located at least one operator, or the distance of travel or the travel time between the current location of the robot and each of the item locations associated with the regions in which are located at least one operator.

4. The method of claim 3 wherein the step of selecting the item location to which the robot is to navigate is based on the shortest travel distance or shortest travel time between the current location of the robot and each of the item locations associated with the regions in which are located at least one operator.

5. The method of claim 3 wherein the step of assessing includes determining the item locations which are within a predetermined distance or travel time between the current location and the respective item locations; and wherein the step of selecting the item location to which the robot is to navigate is determined based on which of the item locations within the predetermined distance or travel time are next in order in the initial order execution sequence.

6. A robot configured to execute orders assigned by a warehouse management system, each order including a plurality of items and each item being located at an item location within one of a plurality of regions in a warehouse, the robot comprising:

a mobile base;

a communication device enabling communication between the robot and the warehouse management system; and a processor and memory, responsive to communications with the management system, configured to:

receive an order to be executed by the robot, the order including a plurality of items, each item associated with an item location in the warehouse;

identify one or more regions of the plurality of regions which that include at least one item location associated with an item in the order received by the robot;

determine, from the one or more regions identified to include at least one item location associated with an item in the order received by the robot, the region or regions that include at least one operator of the plurality of operators;

assess criteria relating to a current location of the robot and to the item locations associated with the one or more regions in which are located at least one operator; the criteria including one or both of a distance of travel or a travel time between the current location of the robot and each of the item locations associated with the one or more regions in which are located at least one operator; and select an item location of an item in the order to which the robot is to navigate from a current location; the selection being based on an assessment of the criteria relating to the current location of the robot and to the item locations associated with one or more regions in which are located at least one operator; the selection being further based in part on one or both of a region of the plurality of regions that have a higher number of operators or a higher operator to robot ratio.

7. The robot of claim 6 wherein executing orders includes performing one or more of a pick, a place or a maintenance function on the items in the orders.

8. The robot of claim 7 wherein the processor and memory are configured to determine an initial order execution sequence for the plurality of items in each order and to assess one or more of the order in the order sequence of each item in the one or more regions in which are located at least one operator, or the distance of travel or the travel time between the current location of the robot and each of the item locations associated with the one or more regions in which are located at least one operator.

9. The robot of claim 8 wherein the processor and memory are configured to select the item location to which the robot is to navigate based on the shortest travel distance or shortest travel time between the current location of the robot and each of the item locations associated with the one or more regions in which are located at least one operator.

10. The robot of claim 8 wherein the processor and memory are configured to determine the item locations which are within a predetermined distance or travel time between the current location and the respective item locations and to select the item location to which the robot is to navigate based on which of the item locations within the predetermined distance or travel time are next in order in the initial order execution sequence.

11. A method for executing orders assigned to a plurality of robots operating in a warehouse, wherein the robots interact with a warehouse management system to execute orders with the assistance of a plurality of operators, each order including a plurality of items and each item being located in the warehouse, the method comprising:

receiving, by a robot of the plurality of robots, an order to be executed by the robot, the order including a plurality of items, each item associated with an item location in the warehouse;

determining an initial order execution sequence for the plurality of items in each order;

defining a plurality of regions within the warehouse;

identifying the regions of the plurality of regions which include at least one item location associated with an item in the order received by the robot;

determining, from the regions identified to include at least one item location associated with an item in the order received by the robot, the regions which include at least one operator of the plurality of operators;

assessing, in the regions which include at least one operator of the plurality of operators, the item locations which are within a predetermined distance or travel time between the current location and the respective item locations; and selecting the item location to which the robot is to navigate based on which of the item locations within the predetermined distance or travel time are next in order in the initial order execution sequence.

12. A robot configured to execute orders assigned by a warehouse management system, each order including a plurality of items and each item being located at an item location within one of a plurality of regions in a warehouse, the robot comprising:

a mobile base;

a communication device enabling communication between the robot and the warehouse management system; and a processor and memory, responsive to communications with the management system, configured to:

receive an order to be executed by the robot, the order including a plurality of items, each item associated with an item location in the warehouse;

determine an initial order execution sequence for the plurality of items in the order;

identify one or more regions of the plurality of regions which include at least one item location associated with an item in the order received by the robot;

determine, from the one or more regions identified to include at least one item location associated with an item in the order received by the robot, the region or regions which include at least one operator of the plurality of operators;

assess, in the regions which include at least one operator of the plurality of operators, the item locations which are within a predetermined distance or travel time between the current location and the respective item locations; and select the item location to which the robot is to navigate based on which of the item locations within the predetermined distance or travel time are next in order in the initial order execution sequence.

\* \* \* \* \*

UNITED STATES PATENT AND TRADEMARK OFFICE
CERTIFICATE OF CORRECTION

| | | |
|---|---|---|
| PATENT NO. | : 11,741,564 B2 | Page 1 of 1 |
| APPLICATION NO. | : 17/017758 | |
| DATED | : August 29, 2023 | |
| INVENTOR(S) | : Johnson et al. | |

It is certified that error appears in the above-identified patent and that said Letters Patent is hereby corrected as shown below:

On the Title Page

Item (54) and in the Specification Column 1, Lines 1-3 replace "SEQUENCE ADJUSTMENT FOR EXECUTING FUNCTIONS ON HEMS IN AN ORDER" with "SEQUENCE ADJUSTMENT FOR EXECUTING FUNCTIONS ON ITEMS IN AN ORDER"

Signed and Sealed this
Tenth Day of June, 2025

Coke Morgan Stewart
*Acting Director of the United States Patent and Trademark Office*